(12) United States Patent
Carlstrom et al.

(10) Patent No.: US 11,316,173 B2
(45) Date of Patent: Apr. 26, 2022

(54) FUEL CELL STACK

(71) Applicant: PLUG POWER INC., Latham, NY (US)

(72) Inventors: Charles Carlstrom, Saratoga Springs, NY (US); Owen Carlstrom, Saratoga Springs, NY (US)

(73) Assignee: PLUG POWER INC., Latham, NY (US)

( * ) Notice: Subject to any disclaimer, the term of this patent is extended or adjusted under 35 U.S.C. 154(b) by 0 days.

(21) Appl. No.: 16/460,236

(22) Filed: Jul. 2, 2019

(65) Prior Publication Data

US 2021/0005904 A1    Jan. 7, 2021

(51) Int. Cl.
| | |
|---|---|
| *H01M 8/0258* | (2016.01) |
| *H01M 8/1004* | (2016.01) |
| *B29L 31/34* | (2006.01) |
| *B29K 101/12* | (2006.01) |
| *B29C 51/08* | (2006.01) |

(52) U.S. Cl.
CPC ....... *H01M 8/0258* (2013.01); *H01M 8/1004* (2013.01); *B29C 51/082* (2013.01); *B29K 2101/12* (2013.01); *B29L 2031/3468* (2013.01)

(58) Field of Classification Search
CPC ............. H01M 8/0258; H01M 8/1004; H01M 8/0265; B29C 51/082; B29K 2101/12; B29L 2031/3468
See application file for complete search history.

(56) References Cited

U.S. PATENT DOCUMENTS

| | | | |
|---|---|---|---|
| 2004/0151973 A1 | 8/2004 | Rock | |
| 2012/0025420 A1 | 2/2012 | Utashiro et al. | |
| 2014/0087287 A1* | 3/2014 | Suzuki | ............... H01M 8/0213 |
| | | | 429/479 |

FOREIGN PATENT DOCUMENTS

| | | |
|---|---|---|
| CN | 109065907 A | 12/2018 |
| JP | 2005100697 A | 4/2005 |
| JP | 2007122899 A | 5/2007 |

OTHER PUBLICATIONS

JP2007122899A—Machine Translation (Year: 2007).*
PCT International Search Report and Written Opinion dated Aug. 13, 2020.

* cited by examiner

*Primary Examiner* — Brian R Ohara
*Assistant Examiner* — Patrick Marshall Greene
(74) *Attorney, Agent, or Firm* — Heslin Rothenberg Farley & Mesiti P.C.; Victor A. Cardona, Esq.

(57) ABSTRACT

A fuel cell system includes a first fluid flow plate including a first plurality of first channels for flow of an oxidant or a fuel. The plurality of first channel has first channel cross-sectional flow areas. A second fluid flow plate includes a second plurality of second channels for flow of an oxidant or a fuel. The plurality of second channels has second channel cross-sectional flow areas. A membrane electrode assembly is located between the first plate and the second plate. The first flow plate includes a passage for a flow of a fluid entirely on a seam side of the first flow plate as the first plurality of first channels. The passage has a cross-sectional area for flow of the fluid smaller than the first channel cross-sectional flow area.

8 Claims, 9 Drawing Sheets

FUEL CELL STACK

TECHNICAL FIELD

This invention relates in general to electrochemical cells, and more particularly to fuel cells systems and methods.

BACKGROUND OF THE INVENTION

Fuel cells electrochemically convert fuels and oxidants to electricity and heat and can be categorized according to the type of electrolyte (e.g., solid oxide, molten carbonate, alkaline, phosphoric acid or solid polymer) used to accommodate ion transfer during operation. Moreover, fuel cell assemblies can be employed in many (e.g., automotive to aerospace to industrial to residential) environments, for multiple applications.

A Proton Exchange Membrane (hereinafter "PEM") fuel cell converts the chemical energy of fuels such as hydrogen and oxidants such as air directly into electrical energy. The PEM is a sold polymer electrolyte that permits the passage of protons (i.e., H+ ions) from the "anode" side of the fuel cell to the "cathode" side of the fuel cell while preventing passage therethrough of reactant fluids (e.g., hydrogen and air gases). The Membrane Electrode Assembly (hereinafter "MEA") is placed between two electrically conductive plates, each of which has a flow passage to direct the fuel to the anode side and oxidant to the cathode side of the PEM.

Two or more fuel cells can be connected together to increase the overall output of the assembly. Generally, the cells are connected in series, wherein one side of a plate serves as an anode plate for one cell and the other side of the plate is the cathode plate for the adjacent cell. These are commonly referred to as bipolar plates (hereinafter "BPP"). Alternately, the anode plate of one cell is electrically connected to the separate cathode plate of an adjacent cell. Commonly these two plates are connected back to back and are often bonded together (e.g., bonded by adhesive, weld, or polymer). This bonded pair becomes as one, also commonly called a bipolar plate, since anode and cathode plates represent the positive and negative poles, electrically. Such a series of connected multiple fuel cells is referred to as a fuel cell stack or fuel cell system. The stack typically includes means for directing the fuel and the oxidant to the anode and cathode flow field channels, respectively. The stack usually includes a means for directing a coolant fluid to interior channels within the stack to absorb heat generated by the exothermic reaction of hydrogen and oxygen within the fuel cells. The stack generally includes means for exhausting the excess fuel and oxidant gases, as well as product water.

The stack also includes an endplate, insulators, membrane electrode assemblies, gaskets, separator plates, electrical connectors and collector plates, among other components, that are integrated together to form the working stack designed to produce electricity. The different plates may be abutted against each other and connected to each other to facilitate the performance of particular functions.

Such fuel cell plates are typically formed of stainless steel and machine molded, or stamped. The only viable process for bonding such metal plates together is welding. Welding is a relatively slow and costly process compared to solvent bonding and friction welding, which are not possible.

If fuel cell plates were formed of thermoset molded composite material the bonding of two thermal set plates typically requires a cooler side of a plate to be coated with a conductive glue to bond adjacent plates together. Such glue is not as conductive as a base product and the glue typically creates defects by inaccurate placement thereof or incomplete coverage of the glue which may create bonding problems. The gluing process is also typically time intensive.

Thus, a need exists for improved fuel cell systems and improved methods for manufacturing fuel cells that allow features to be formed in fuel cell plates.

SUMMARY OF THE INVENTION

The present invention provides, a method for use in forming a fuel cell plate which includes providing a sheet of conductive thermoplastic material and heating the sheet to soften the sheet. The sheet is pressed between two molds having a fuel cell plate feature forming element to form a fuel cell plate having a fuel cell feature conforming to the element. The fuel cell plate is cooled in the molds.

The present invention provides in a second aspect, a fuel cell system including a first fluid flow plate including a first plurality of first channels for flow of an oxidant or a fuel. The plurality of first channels has first channel cross-sectional flow areas. A second fluid flow plate includes a second plurality of second channels for flow of an oxidant or a fuel. The plurality of second channels has second channel cross-sectional flow areas. A membrane electrode assembly is located between the first plate and the second plate. The first flow plate includes a passage for a flow of a fluid entirely on a same side of the first flow plate as the first plurality of first channels. The passage has a cross-sectional area for flow of the fluid smaller than the first channel cross-sectional flow area.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DETAILED DESCRIPTION

In accordance with the principles of the present invention, fuel cell systems and methods are provided.

Figure 1:
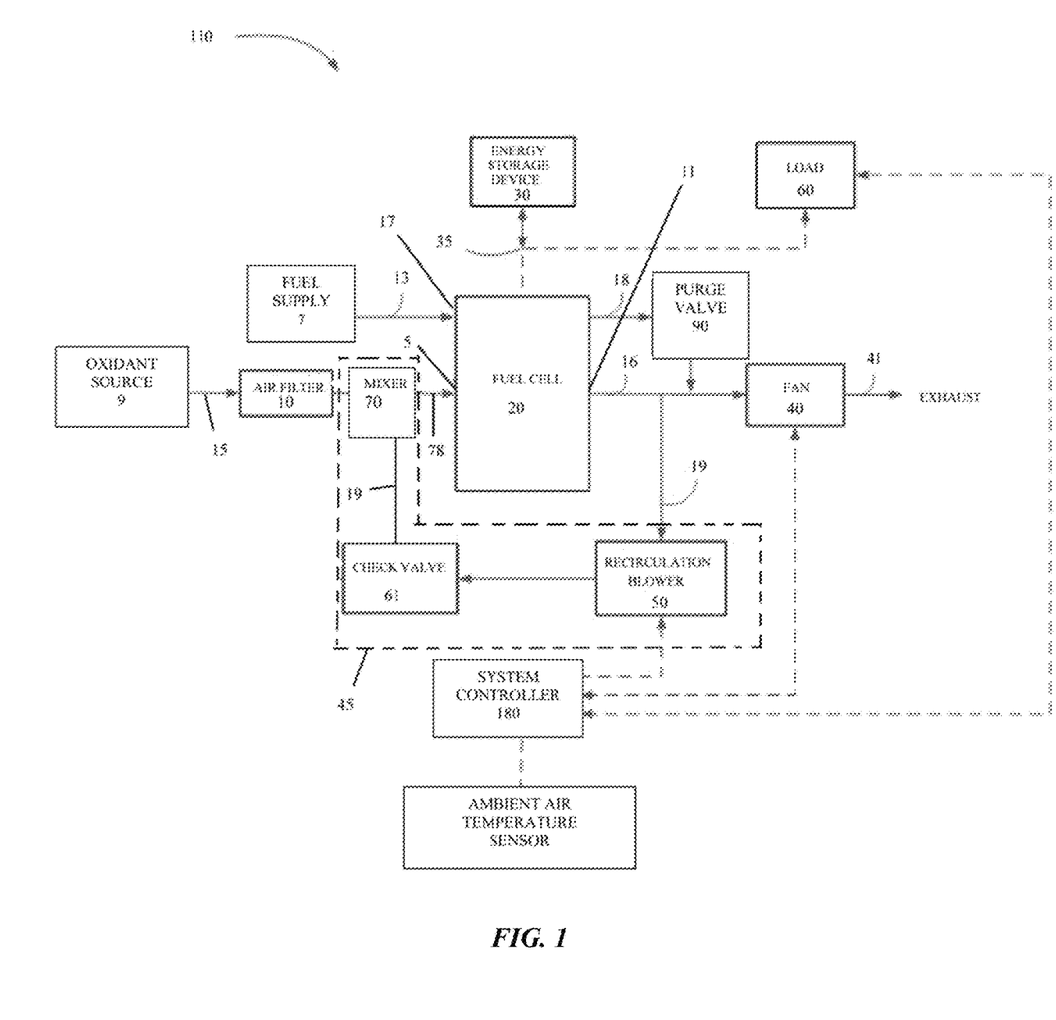
FIG. 1 is a block diagram of a fuel cell system in accordance with the invention.

In an example depicted in FIG. 1, a fuel cell system 10 is referred to as the assembled, or complete, system which functionally together with all parts thereof produces electricity and typically includes a fuel cell stack 20 and an energy storage device (30). The fuel cell is supplied with a fuel 13, for example, hydrogen, through a fuel inlet 17. Excess fuel 18 is exhausted from the fuel cell through a purge valve 90 and may be diluted by a fan 40. In one example, fuel cell stack 20 may have an open cathode architecture of a PEM fuel cell, and combined oxidant and coolant, for example, air, may enter through an inlet air filter 10 coupled to an inlet 5 of fuel cell 20. Excess coolant/oxidant and heat may be exhausted from a fuel cell cathode of fuel cell stack 20 through an outlet 11 to fan 40 which may exhaust the coolant/oxidant and/or excess fuel to a waste exhaust 41, such as the ambient atmosphere. The fuel and coolant/oxidant may be supplied by a fuel supply 7 and an oxidant source 9 (e.g., air), respectively, and other components of a balance of plant, which may include compressors, pumps, valves, fans, electrical connections and sensors.

Figure 2:
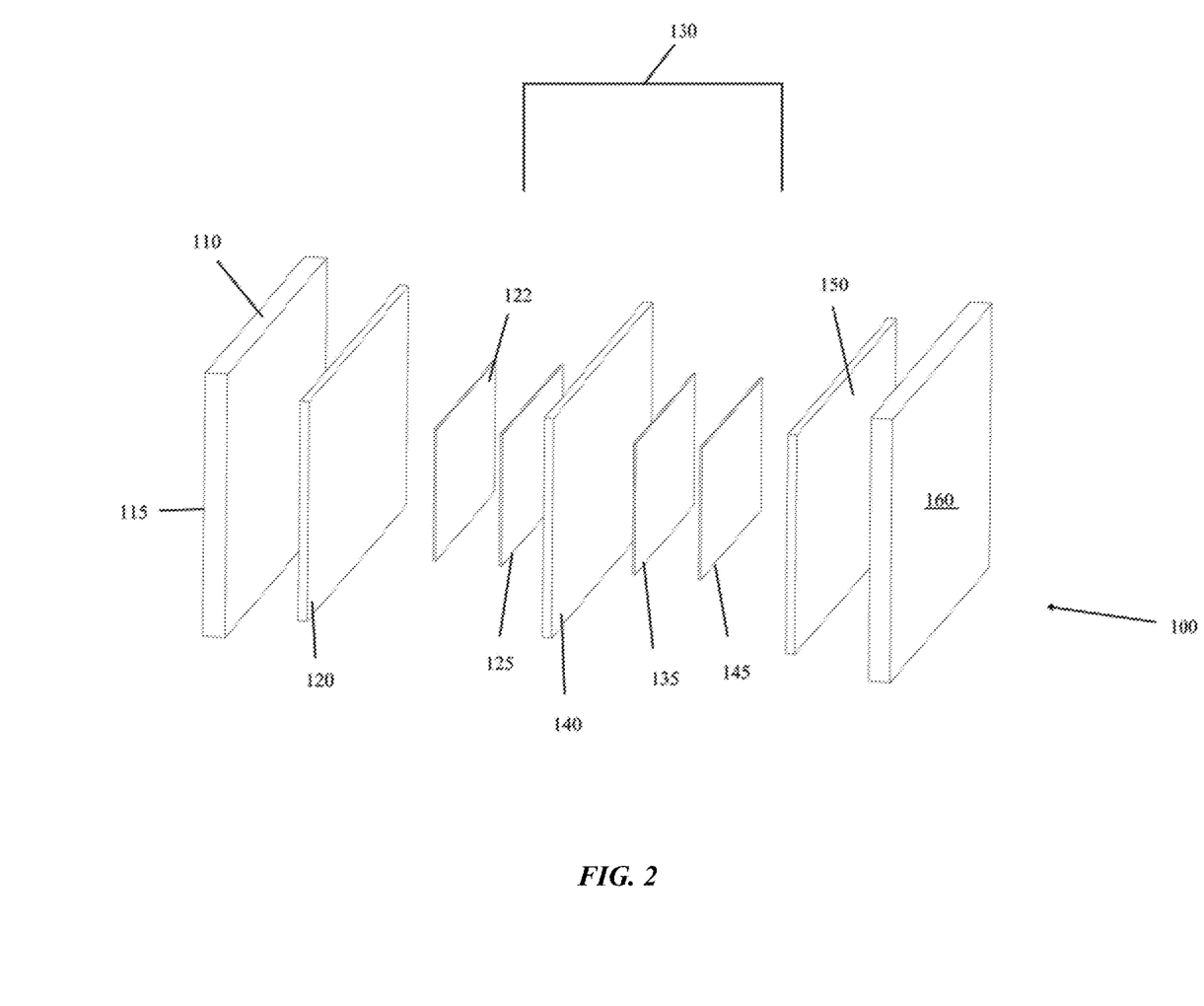
FIG. 2 is a perspective view of a portion of a fuel cell of the fuel cell system of FIG. 1.

FIG. 2 depicts an internal subassembly 100 of fuel cell stack 20 of FIG. 1 including a cathodic end fluid flow plate 110 at an outer end 115 and a flow plate seal 120 on an inner side thereof. A membrane electrode assembly (MEA) 130 is located between seal 120 and a second flow plate seal 150. An anode flow plate 160 is on a second end 165 of subassembly 100.

MEA 130 includes a membrane 140 between a cathode side catalyst layer 125 and an anode side catalyst layer 135. A cathode side gas diffusion layer (GDL) 122 is located between cathode side catalyst layer 125 and flow plate 110. An anode side gas diffusion layer 145 is located between anode side catalyst layer 135 and flow plate 160. Seal 120 and seal 150 may be received in a channel of on an inner side of flow plate 110 and flow plate 160, respectively.

Figure 3:
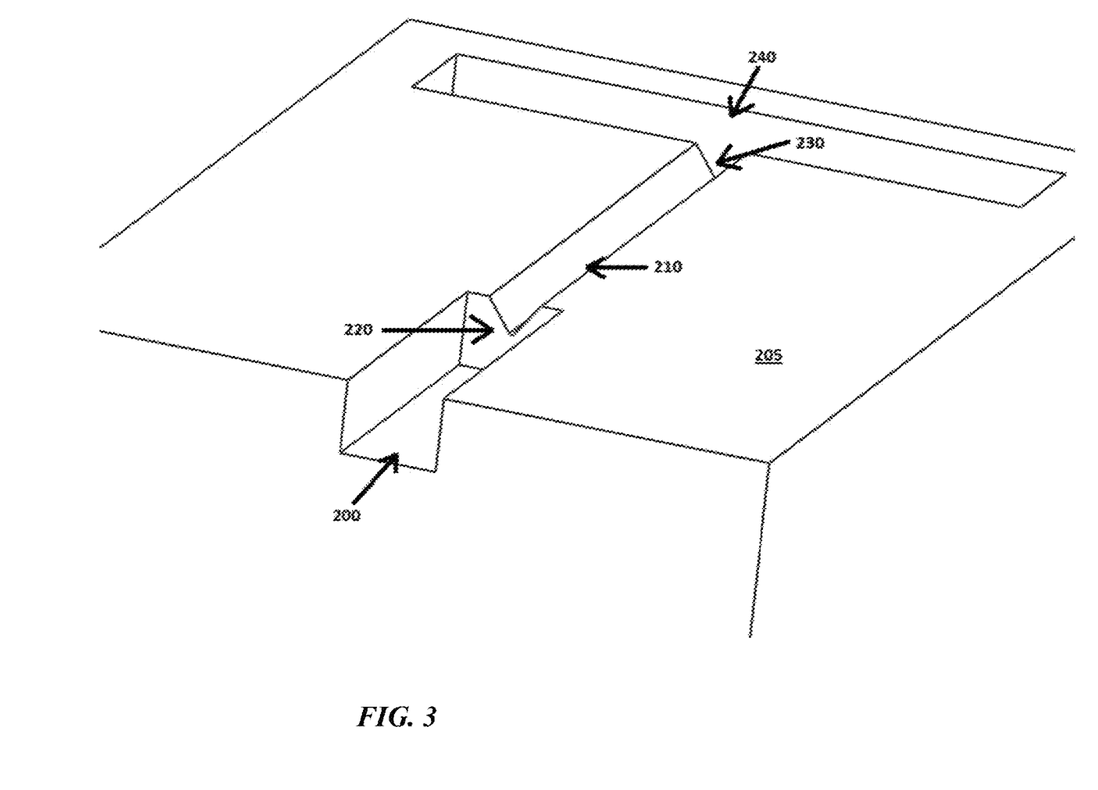
FIG. 3 is a perspective view of a channel and flow restrictor of the fuel cell system of FIG. 1.

FIG. 3 depicts a channel 200 of a plate 205 of a fuel cell (e.g., fuel cell 20) for receiving a flow of a fluid (e.g., a fuel or oxidant). Plate 205 may be a cathode plate or an anode plate, as in plate 110 and plate 160, respectively, described above. A flow restrictor 210 may be upstream of (i.e., provides a flow of fluid to) channel 200 and may have a smaller cross-sectional area than channel 200. An intersection 220 where channel 200 and flow restrictor 210 meet may provide a reduction of pressure of fluid flowing through flow restrictor 210 into channel 200 due to the difference in cross-section areas therebetween.

Flow restrictor 210 may include an entrance end 230 which receives fluid from a channel 240 (or other flow providing structure) having a larger cross-sectional area than flow restrictor 210 and larger than channel 200. Thus, a flow volume per unit time may be less in flow restrictor 210 relative to channel 240 flowing into flow restrictor 210. As the fluid flows from flow restrictor 210 into channel 200 an available cross-sectional area may increase compared to the cross sectional area of flow restrictor 210 such that a pressure drop may occur in channel 200.

The described change in cross-sectional area from channel 240 to flow restrictor 210 relative to channel 200 may provide a desired reduction in pressure to the fluid flowing in channel 200 relative to channel 240. Multiple such pressure drops for multiple channels arranged in parallel prior to water generation may balance flows from channel to channel due to the reduction in flow at the entrances of the multiple inlet restrictors. Such a reduction in flow prior to entering channel 200 may inhibit a production of water in the channel of the fuel cell due to a reduction in the amount of flow present per unit time and any resultant dwell time.

Figure 4:
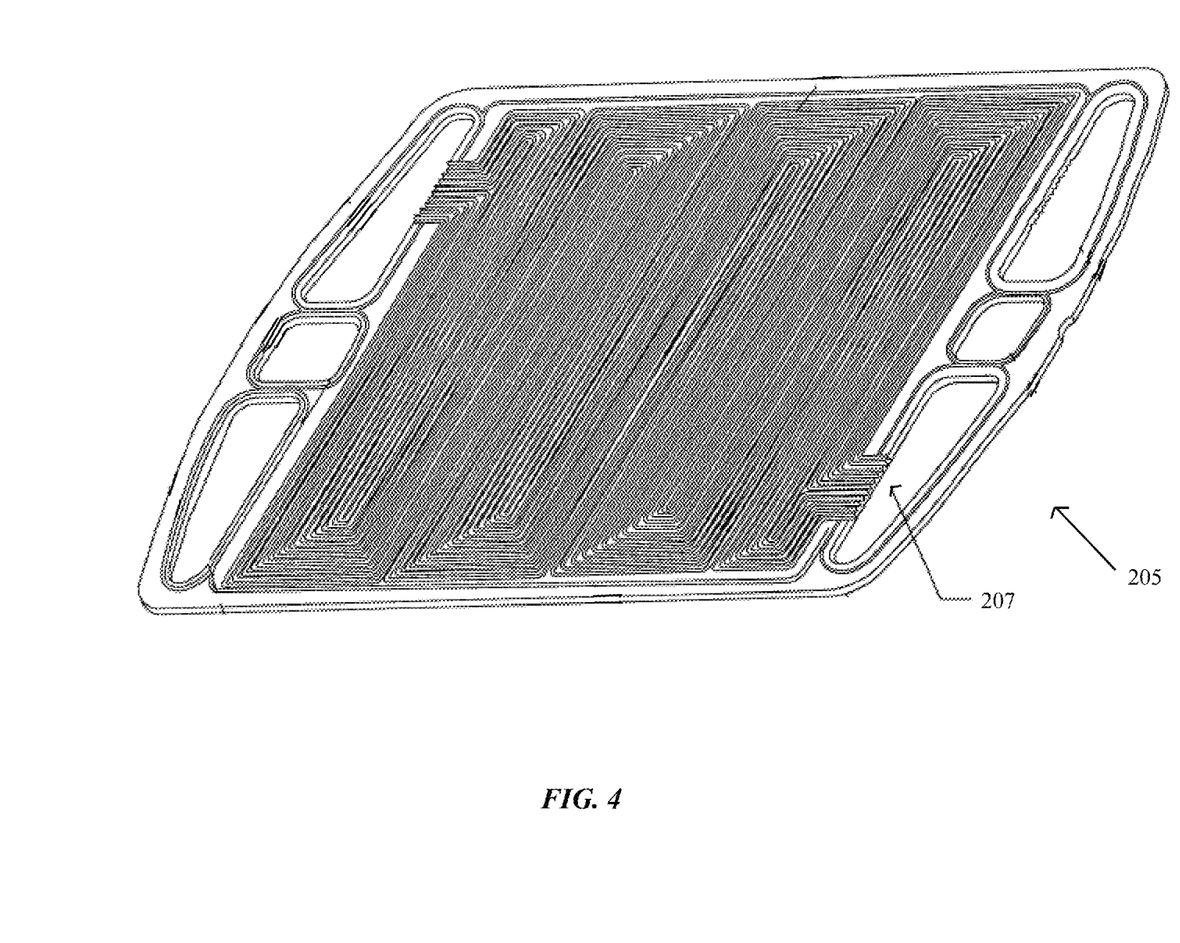
FIG. 4 is a perspective view of a fuel cell plate of the fuel cell system of FIG. 1.
Figure 5:
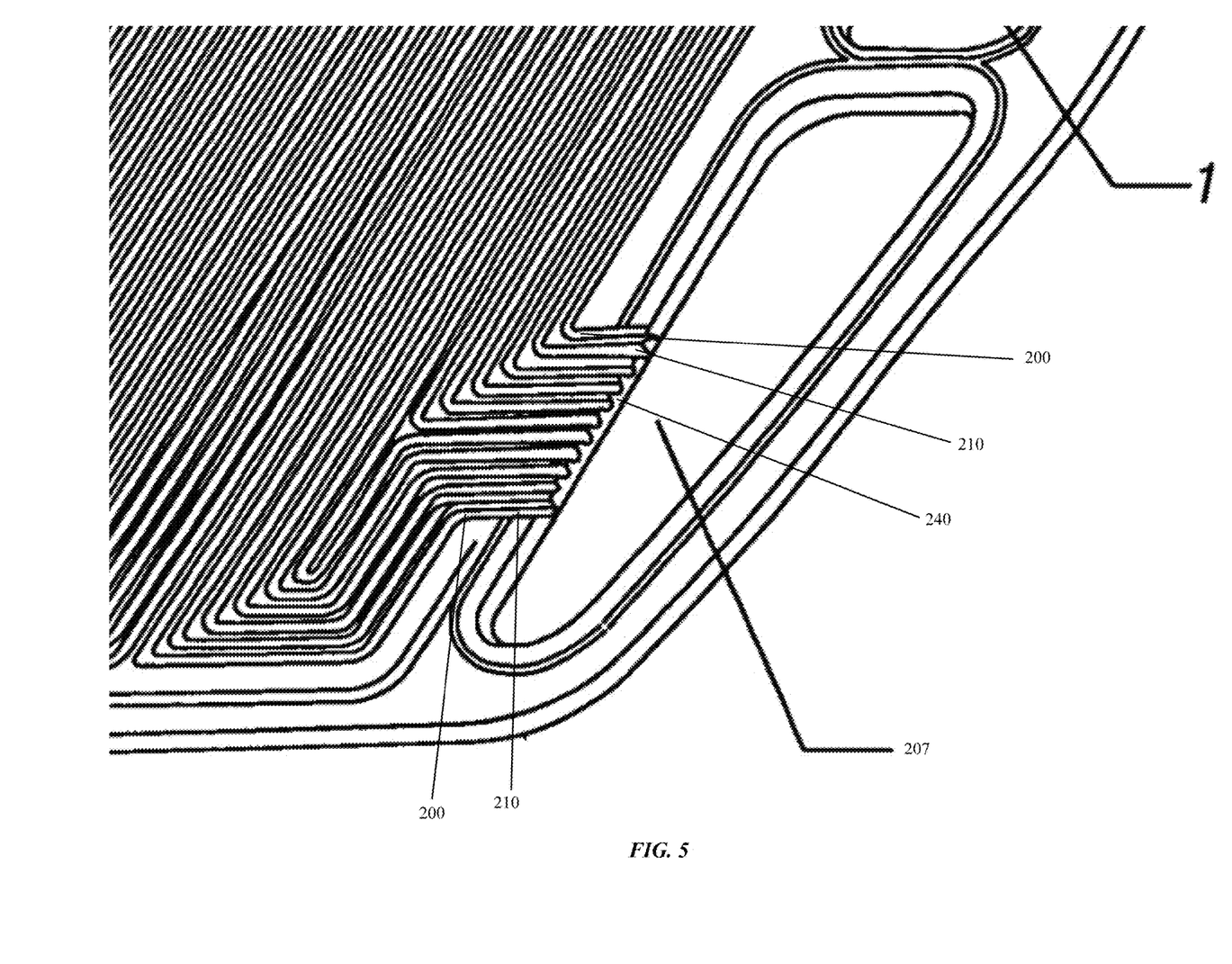
FIG. 5 is a perspective view of a portion of the fuel cell plate of FIG. 4.

For example, multiple instances of the channel (e.g., channel 200) and flow restrictor (e.g., flow restrictor 210) may form an anode inlet 207 of an anode plate (e.g., plate 205) as depicted in FIGS. 4-5. In another example, such channels and flow restrictors may form a cathode inlet of a cathode plate (not shown).

Figure 6:
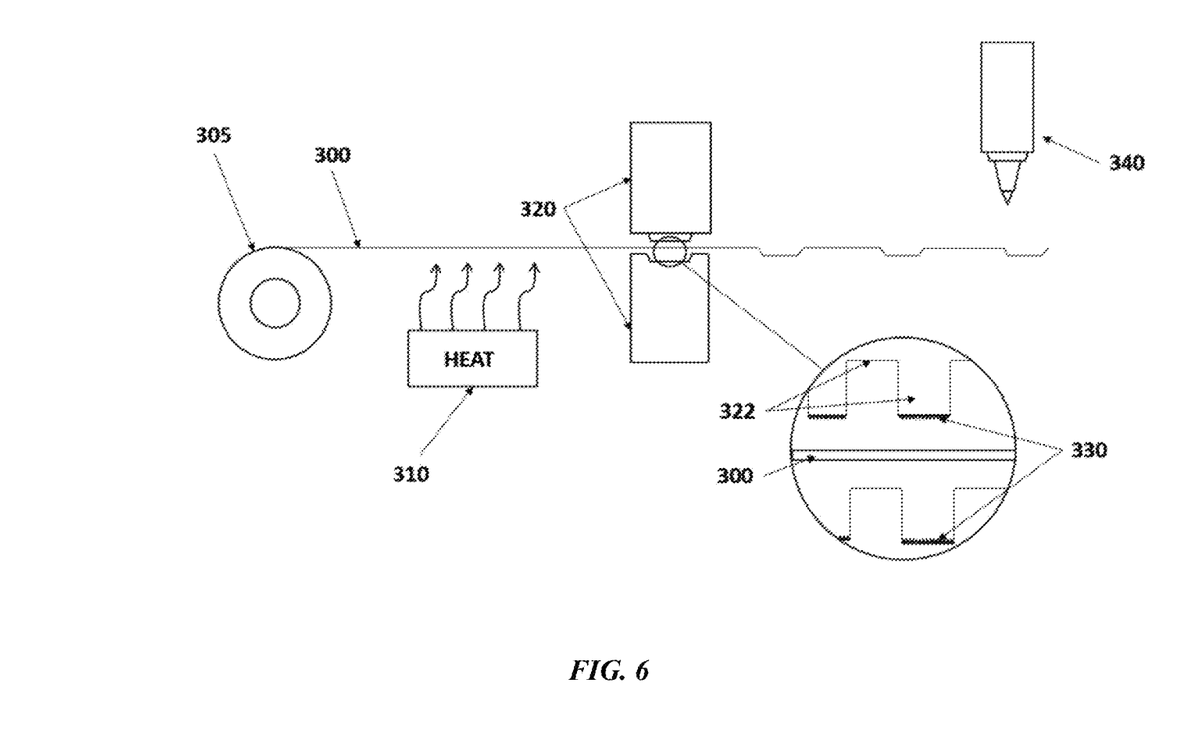
FIG. 6 depicts a process for forming the fuel cell plate of FIG. 4.

Plate 205 may include multiple iterations of channel 200 and flow restrictor 210 and may be formed from a thin conductive plastic sheet, such as Kynar, LCP and PPS which could have a dimension of 0.15 mm. Such thermoplastics may be formed into sheet stock by hot rolling. FIG. 6 depicts a method for producing a fuel cell plate, such as plate 205. A sheet 300 may be unwound off a roll 305, and may be warmed and softened, by a heater 310 or oven (e.g., to a temperature such that sheet 305 holds together and soft enough such that sheet 305 would not crack during a stamping process) on the way to a press 320 (e.g., a sheet metal type speed stamping press) where the sheet is struck with a male and female cavity defining a part (e.g., a fuel cell plate having flow restrictor 210) desired. Once warm, the plastic sheet will form to the contours of inner surfaces 322 of the press and may be elongated (e.g., elongated 30%) to achieve a desired plate geometry, such as to replicate current stainless steel plates. Further, additional features not possible in current plates, such as flow restrictor 210, may be formed using the described method. More specifically, inner surfaces 322 may include feature details 330 to form such features (e.g., flow restrictor 210) not possible using the method of the prior art. The press or tool remains cool, i.e., having a temperature such that the hot soft plastic may cool and solidify into the shape desired (e.g., fuel cell plate 205 with flow restrictor 210) as described. Laser cutting and welding may be performed using a trimming mechanism 340 (e.g., a laser cutting tool) to trim and weld the plate (e.g., plate 205) formed using the indicated method.

The plastic sheet (e.g., Kynar, LCP or PPS having a dimension of 0.15 mm) may be much less expensive, corrosion resistant and lighter than the 316L coated stainless steel used in the prior art to form fuel cell plates. Further, the thickness of the completed fuel cell plate may be about that of a stainless steel fuel cell plate (e.g., about 0.2 mm) but would be lighter than such a stainless steel plate.

Further, the indicated method may also include the plastic sheet being pierced to provide a pressure drop or dive through hole in a fuel cell plate (e.g., fuel cell plate 205). Such piercing may be performed using a pin, such as a 0.010 inch diameter pin, and the piercing may be performed prior to the introduction of the sheet into the press or after such pressing. A pin could also be part of the press such that the piercing is done at the same time as the pressing. If the piercing were done before or after the pressing, the pin may be heated to facilitate the pin melting through the material. Such piercing of the plastic sheet would not be viable using a harder raw material such as stainless steel since the indicated pin would not be able to penetrate the steel or would not be durable enough for multiple uses. The use of a pin for such a process as is possible with the plastic sheet of the indicated method, relative to drilling or other processes as would be necessary for harder materials, is that the use of the pin is less expensive due to its durability for multiple piercings with the material.

Figure 7:
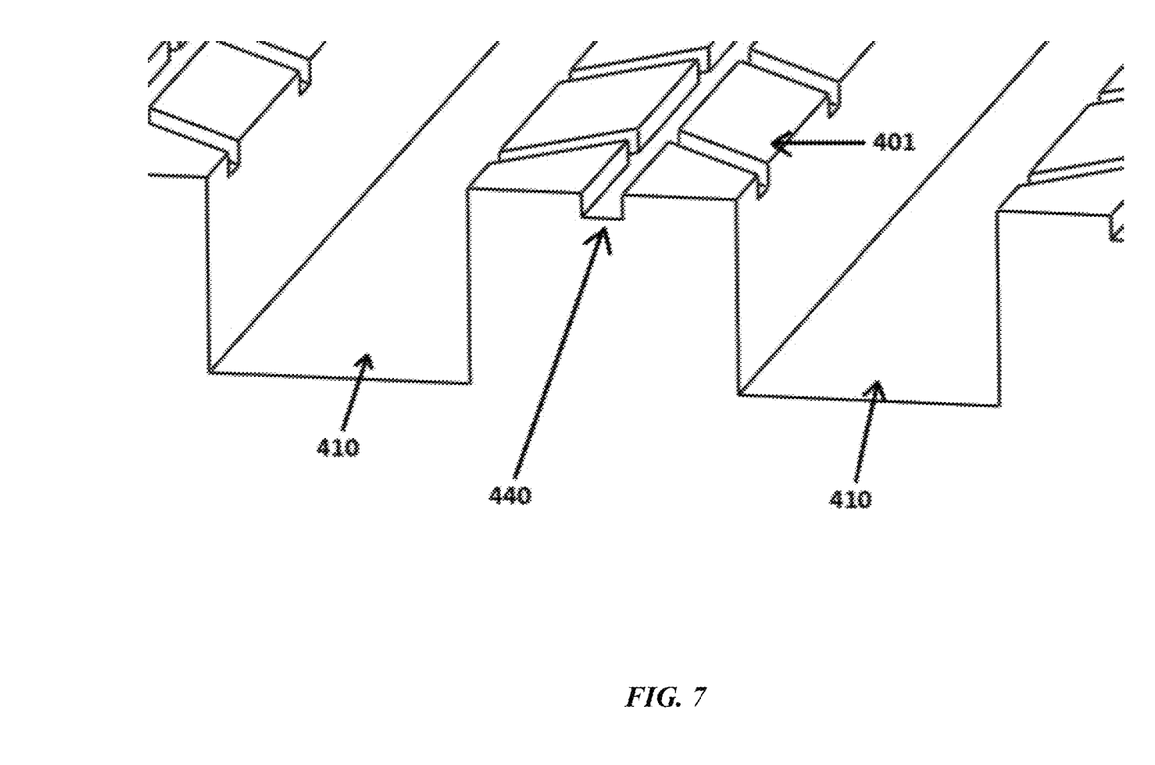
FIG. 7 is a perspective view of a land of a fuel cell plate including a groove for a flow of fluid.
Figure 8:
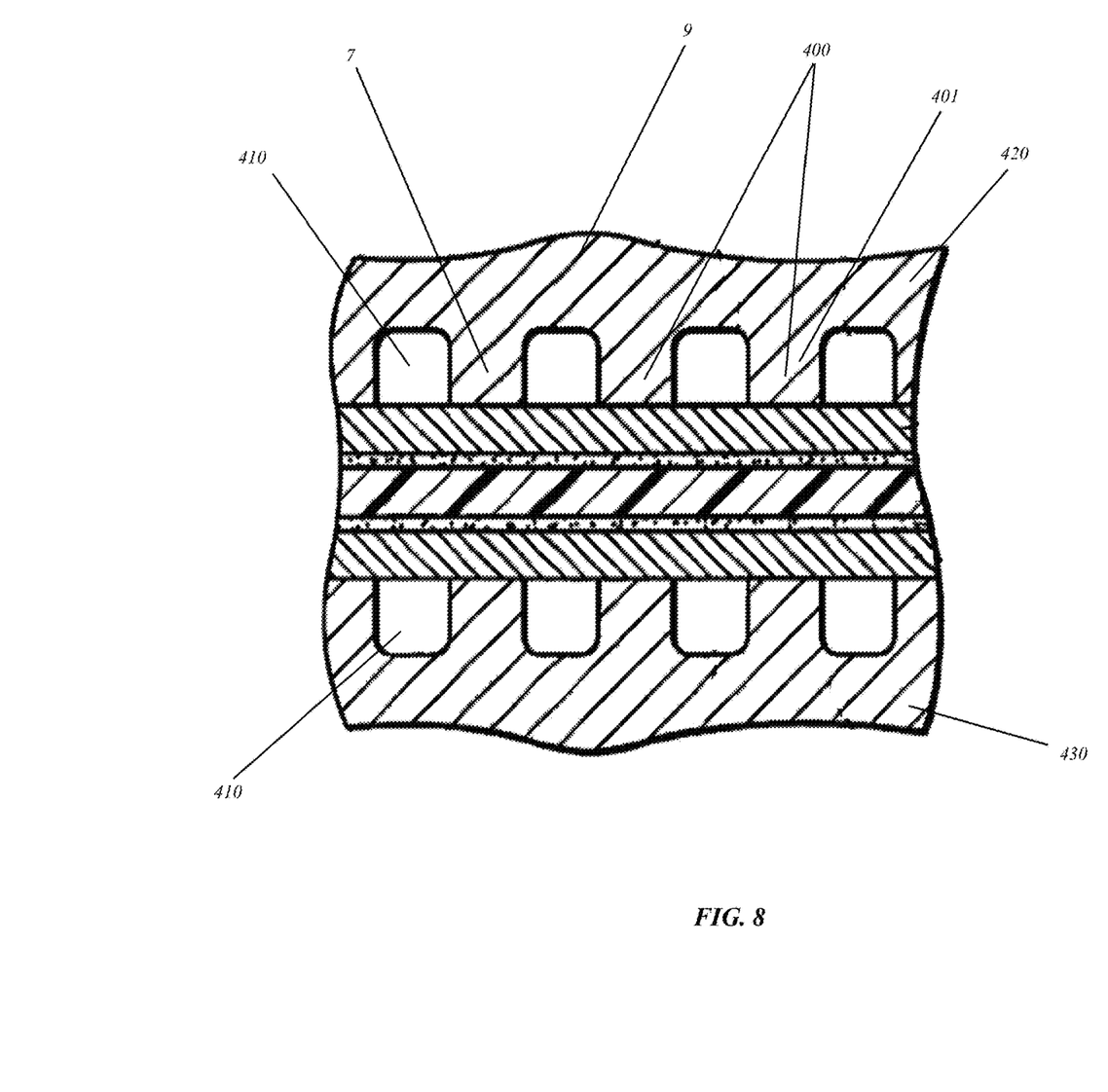
FIG. 8 is a side cross-sectional view of two fuel cell plates including the land and groove of FIG. 7 and a channel including a groove.

In an example depicted in FIGS. 7-8, lands 400 may separate channels 410 of a fluid flow field of an anode fuel cell plate 420 or a cathode fuel cell plate 430. One or more of lands 400 may include micro channels or grooves 440 therein which may be formed as features using appropriate feature details (e.g., feature details 330) of inner surfaces 330 of press 320 in the method described above and depicted in FIG. 6. Such grooves may allow a gas access to a portion of a MEA (e.g., MEA 130) under a land (e.g., a land 401 of lands 400) of a fuel cell plate (e.g., cathode plate 420). Also such grooves may allow water a pathway to be removed without having to move in a plane of a GDL (e.g., GDL 522). Such grooves may have a depth and/or width dimension of 0.001"-0.010", for example, and may be extend along a length of a land (e.g., land 40). In another example, the grooves may have a depth and/or width dimension of 0.0005" to 0.015". As indicated, such grooves may be formed using the method described above of heating a thermoset plastic and pressing the plastic to a desired shape including such grooves. Prior art methods would not allow the grooves to be easily attained since the groove would require material to be removed from the lands in a metal stamping process and in thermal set molded plates, the material would also need to be removed after molding where such removal would present a risk of damage to the molded plates, such as by scuffing the surface of the plate by a required removal process.

Figure 9:
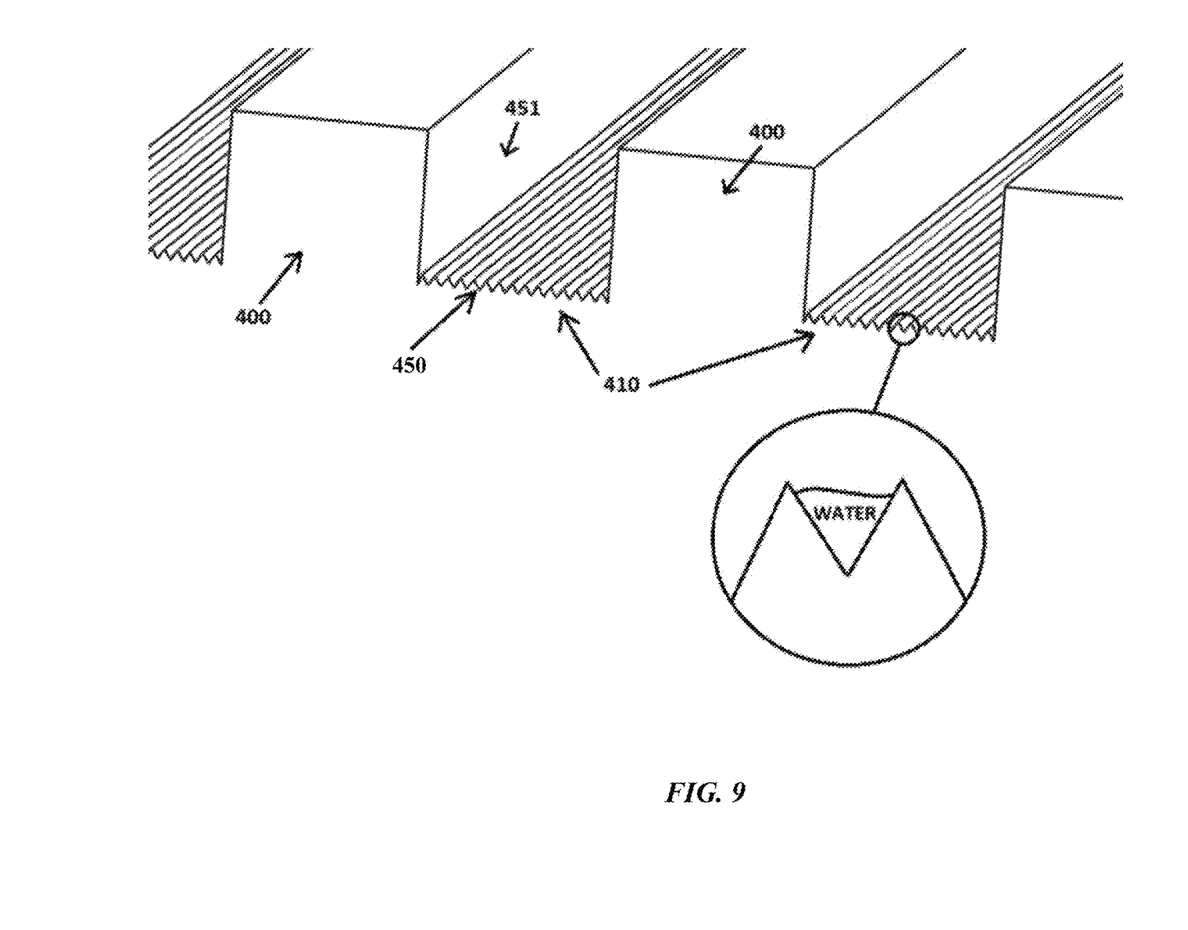
FIG. 9 depicts the channel and groove of FIG. 8.

In another example depicted in FIGS. 8-9, channels 400 of cathode plate 420 and/or anode plate 430 may include micro grooves 450 therein to allow water to move therethrough, for example. Such flow of water in the micro grooves may occur without interfering with bulk gas flow in a channel 451 of channels 400 in which such gas may flow. For example, the water may flow with gravity in micro groove 450 in a direction opposite to that of the gas flow in channel 451. Also, micro grooves 450 may have a depth and/or width dimension of 0.001"-0.010", for example. Such micro grooves could also have depth and/or width dimensions of 0.0005" to 0.015".

Microchannels 450 may formed in a process similar to that of flow restrictors 210 and grooves 440 as described above. For example, microchannels may be formed as features using appropriate feature details 330 of inner surfaces 322 in the method described above and depicted in FIG. 6. Similar to grooves 440, microchannels 450 are very difficult to achieve in the prior art, such as metal stamped plate because the microchannels would require material to be removed from the channels in a metal stamping process and in thermal set molded plates, the material would also need to be removed after molding which such removal presents a risk of damage to the plates. Also, in contrast, if formed using a molded thermal set process, the formation of grooves 440 and microchannels 450 may create stress risers in a plate material making it prone to cracking which is undesirable. More specifically, the machining of grooves into a compression molded plate, as in the prior art, could crack a plate during machining or a stress riser could be created during machining that could cause a crack to occur in the plate later. The formation of plate features in the above described method of the present invention, according to feature details 330 of press 320, minimizes the likelihood of such stress risers since the features are formed during the pressing process and does not require additional machining to create such features which could cause cracks and/or stress risers.

The load described above could be any type of stationary or moveable load device, such as an industrial electrical vehicle or forklift truck. The fuel cell (e.g., fuel cell system 20) could be any type of fuel cell such as a proton exchange membrane fuel cell, solid oxide fuel cell, or any other fuel cell as would be known by one of ordinary skill in the art. The energy storage device described above could be any type of battery or other way of storing energy such as a lithium ion battery, lead acid battery, air compression energy storage device, water storage device, capacitor, ultra-capacitor, or any other device for storing energy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

For the purposes of promoting an understanding of the principles of the invention, reference will now be made to embodiments of the invention and specific language will be used to describe the same. It will nevertheless be understood that no limitation of the scope of the invention is thereby intended, and any alterations and further modifications in the described embodiments, and any further applications of the principles of the invention as illustrated therein as would normally occur to one skilled in the art to which the invention relates are contemplated an protected.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for use in forming a fuel cell plate
   providing a sheet of conductive thermoplastic material;
   heating the sheet to soften the sheet;
   striking the sheet between inner surfaces of the stamping press, the inner surfaces cooler than the sheet, and removing the sheet from the press to allow the sheet to cool to solidify to form a fuel cell plate, the inner surfaces having fuel cell plate feature forming elements to form said fuel cell plate, said fuel cell plate comprising:
      a flow providing channel;
      a plurality of flow field channels;
      a plurality of flow restrictors at an inlet of each flow field channel of the plurality of flow field channels, the plurality of flow restrictors connected to the flow providing channel, each flow restrictor of the plurality of flow restrictors comprising a restrictor channel having a smaller cross-sectional area than each flow field channel of the plurality of flow field channels, the flow providing channel having a larger cross-sectional area than each flow field channel;
      each flow restrictor providing a pressure drop between the flow providing channel and each flow field channel to inhibit water production in each flow field channel.

2. The method of claim 1 wherein the fuel cell plate feature comprises a flow restrictor between a supply of fuel and a channel of a flow field of the fuel cell plate.

3. The method of claim 1, further comprising heating a portion of the fuel cell plate after the solidifying to form the fuel cell plate, and forming a hole through the portion.

4. The method of claim 1 wherein the fuel cell plate feature comprises a groove in a land of the fuel cell plate separating channels of the plate, the groove allowing fluid communication between an end of the land and a portion of a membrane electrode assembly under the land.

5. The method of claim 1 wherein the fuel cell plate feature comprises a groove in a channel of the fuel cell plate to allow a flow of fluid in the groove while gas flows in the channel.

6. A method for use in forming a fuel cell plate
providing a sheet of conductive thermoplastic material;
heating the sheet to soften the sheet;
striking the sheet between inner surfaces of a stamping press, the inner surfaces cooler than the sheet, and removing the sheet from the press to allow the sheet to cool to solidify to form a fuel cell plate, the inner surfaces having fuel cell plate feature forming elements to form said fuel cell plate, said fuel cell plate comprising:
a plurality of flow field channels separated from each other by a plurality of lands;
a groove in a bottom surface of a channel of the plurality of flow field channels, to allow a flow of fluid in the groove while gas flows in the channel.

7. A method for use in forming a fuel cell plate
providing a sheet of conductive thermoplastic material;
heating the sheet to soften the sheet;
striking the sheet between inner surfaces of a stamping press, the inner surfaces cooler than the sheet, and removing the sheet from the press to allow the sheet to cool to solidify to form a fuel cell plate, the inner surfaces having fuel cell plate feature forming elements to form said fuel cell plate, said fuel cell plate comprising:
a plurality of flow field channels separated from each other by a plurality of lands;
a groove in a top surface of a land of the plurality of lands,
the groove allowing fluid communication between an end of the land and a portion of a membrane electrode assembly under the land.

8. The method of claim 6 wherein the flow of fluid comprises water flowing in the groove due to gravity while the gas flows in an opposite direction in the channel.

* * * * *